Patented Aug. 16, 1949

2,479,130

UNITED STATES PATENT OFFICE 2,479,130

ADHESIVE COMPOSITIONS

Joe E. Moose, Reno, Nev., assignor to Monsanto Chemical Company, St. Louis, Mo., a corporation of Delaware No Drawing. Application October 3, 1947, Serial No. 777,857

5 Claims. (Cl. 260—32.8)

The present invention relates to adhesive compositions and particularly to liquid resinous adhesives.

An object of the invention is to provide a liquid adhesive of general utility which is also eminently suitable for use in cementing labels to glass, metal and fibrous surfaces.

Another object is to provide an adhesive which does not penetrate and spoil the appearance of paper labels to which it is applied.

An additional object is to provide an adhesive having drying properties which may be controlled to meet specific requirements.

A further object is to provide an adhesive which is characterized by the fact that it does not cause the label to wrinkle when the latter is applied to a given base.

A still further object is to provide an adhesive which withstands extremes of temperature without substantially affecting its adhesive properties.

Other objects and advantages of the present invention will be apparent to those skilled in the art as the description proceeds.

An adhesive to be effective in cementing labels to glass, metal and fibrous surfaces must possess a combination of properties, the absence of any one of which seriously impairs its usefulness for the above purpose. For example, it must be of such consistency that it can be readily applied manually or in standard labelling machines and it should not cause the label to wrinkle in the process of affixing it to a given base. In addition, it must remain properly plasticized so that in cold weather crystallization of one of its components does not occur, and in warm weather, it must not become too plastic and thereby lose its adhesive properties. Furthermore, it must not penetrate too far into the surface of the label as staining results and causes the label to assume an unsightly appearance. Finally it is essential that the adhesive dry at a rate which is neither too slow nor too fast, that is, it should not dry so slowly that the label is readily dislocated after application, nor should it dry so rapidly that it is not possible to properly position the label on the desired surface without causing wrinkling.

I have discovered that an adhesive composition combining all of the above properties is obtained by blending together a chlorinated mixture of isomeric terphenyls, polystyrene, hydrogenated terphenyls and an organic solvent in the proportions hereinafter indicated. In compounding the above composition, the chlorinated mixture of isomeric terphenyls is added with stirring to an organic solvent and after being dissolved, a hydrogenated terphenyl or a mixture of hydrogenated terphenyls, with or without an organic solvent, is introduced and blended with the chlorinated terphenyl mixture. Upon completing this operation, polystyrene is slowly added with stirring until dissolved and the resulting liquid adhesive is then packed in suitable containers to prevent loss of solvent.

For a more complete understanding of the present invention reference is made to the following illustrative example.

Example 15 parts by weight of Aroclor 5460 was dissolved with stirring in 50 parts by weight of acetone and the solution thus obtained was diluted with 10 parts of a mixture of partially hydrogenated terphenyls (distillation range: 347° C. to 421° C. and pour point of —28° C.), and 10 parts of a solvent mixture consisting of 85% ethylene dichloride and 15% butyl chloride. Then 15 parts by weight of Lustron A was slowly added and the mixing continued until the resin was completely dissolved, whereupon the resulting liquid adhesive was packed in suitable containers.

The above composition was found to have outstanding properties as a label adhesive, and in addition was suitable for adhesively bonding together various combinations of materials such as glass to glass, ceramics to ceramics, leather to leather, wood to wood, paper to paper and cloth to leather or metal.

The label adhesive composition of the instant invention is critical as to components and proportions, that is, it must include four basic constituents, namely, a chlorinated mixture of isomeric terphenyls, hydrogenated terphenyls, polystyrene and an organic solvent and these materials must be present in the following proportions by weight:

| | Per cent |
|---|---|
| Chlorinated terphenyls | 13–17 |
| Polystyrene | 13–17 |
| Hydrogenated terphenyls | 10–15 |
| Volatile organic solvent | 51–64 |

Stated more specifically in terms of definite compounds coming within the scope of the above composition range, the following are the label adhesives which give the most satisfactory results:

| | Per cent |
|---|---|
| Aroclor 5460 | 13–17 |
| Lustron A | 13–17 |
| Partially hydrogenated terphenyls (dist. range: 327–421° C. and pour point −28° C.) | 10–15 |
| Acetone or mixture of 50% acetone and 50% toluene | 59–36 |
| Ethylene dichloride (80–85%)—butyl chloride (15%–20%) mixture | 5–15 |

These compositions, as in the case of the label adhesive obtained in the example, are also suitable for adhesively bonding glass to glass, ceramics to ceramics, leather to leather, wood to wood, paper to paper and cloth to leather or metal.

Aroclor 5460 is a chlorinated mixture of ortho-, meta and para terphenyls containing 60% by weight of chlorine.

Lustron A is a polystyrene resin having a viscosity and average molecular weight indicated in the following tabulation.

| | Viscosity in Dioxane—2% | Average Molecular Weight [1] |
|---|---|---|
| Polystyrene | Centipoises 5.6 | 75,000 |

[1] Figured from the viscosity in dioxane.

The above viscosity and molecular weight figures are approximations since batches are not too consistent. Deviations from batch to batch may be ±5000 from the average molecular weight listed.

While a mixture of partially hydrogenated terphenyls having a distillation range of 327° C.–421° C. and a pour point of −28° C. is preferred, the invention is not restricted thereto as any of the partially hydrogenated terphenyls disclosed and claimed in Patent 2,364,719 to Russell L. Jenkins may be used. In fact, it is also within the scope of the present invention to employ partially or completely hydrogenated terphenyls or mixtures thereof.

The selection of organic solvents depends upon the desired drying rate of the adhesive, which may be varied within wide limits by selecting a low boiling or high boiling solvent or various combinations thereof. In the preparation of label adhesives, however, it is essential that the organic solvent or solvent mixture have a boiling point which lies substantially in the range of about 65° C. to about 100° C.

While I have described several embodiments of my invention, it will be apparent to those skilled in the art that it is not so limited but that it is susceptible of various changes and modifications without departing from the spirit thereof.

What I claim is:

1. An adhesive having substantially the following composition:

| | Per cent |
|---|---|
| Chlorinated terphenyls | 13–17 |
| Polystyrene | 13–17 |
| Hydrogenated terphenyls | 10–15 |
| Volatile organic solvent | 51–64 |

2. A label adhesive consisting of 13% to 17% by weight of a chlorinated mixture of isomeric terphenyls, 13% to 17% by weight of polystyrene, 10%–15% by weight of partially hydrogenated terphenyls and 51% to 64% by weight of an organic solvent, said chlorinated mixture of isomeric terphenyls containing about 60% by weight of chlorine.

3. A label adhesive consisting of 15% by weight of a chlorinated mixture of isomeric terphenyls, 15% by weight of polystyrene, 10% by weight of a mixture of partially hydrogenated isomeric terphenyls, 10% by weight of an ethylene dichloride-butyl chloride mixture and 50% by weight of acetone, said chlorinated mixture of isomeric terphenyls containing about 60% by weight of chlorine.

4. A label adhesive consisting of 15% by weight of a chlorinated mixture of isomeric terphenyls, 15% by weight of polystyrene, 10% by weight of a mixture of partially hydrogenated terphenyls, 10% by weight of an ethylene dichloride-butyl chloride mixture, 25% by weight of acetone and 25% by weight of toluene, said chlorinated mixture of isomeric terphenyls containing about 60% by weight of chlorine and said mixture of partially hydrogenated terphenyls having a distillation range of from 347° C. to 421° C. and a pour point of −28° C.

5. A label adhesive having substantially the following composition:

| | Per cent |
|---|---|
| Chlorinated terphenyls | 13–17 |
| Polystyrene | 13–17 |
| Hydrogenated terphenyls | 10–15 |
| Organic solvent boiling within the range of about 65° C. to about 100° C. | 51–64 |

JOE E. MOOSE.

REFERENCES CITED

The following references are of record in the file of this patent:

UNITED STATES PATENTS

| Number | Name | Date |
|---|---|---|
| 2,333,513 | Berberich et al. | Nov. 2, 1943 |